United States Patent

[11] 3,611,978

| [72] | Inventor | Robert Gray<br>Furret Cottage, Fishbourne Green, near Ryde, England |
|---|---|---|
| [21] | Appl. No. | 855,277 |
| [22] | Filed | Sept. 4, 1969 |
| [45] | Patented | Oct. 12, 1971 |
| [32] | Priority | Sept. 4, 1968, July 24, 1969 |
| [33] | | Great Britain |
| [31] | | 42,121/68 and 37,360/69 |

[54] AMPHIBIOUS VEHICLES
6 Claims, 5 Drawing Figs.
[52] U.S. Cl. ............................................. 115/0.5 A
[51] Int. Cl. ............................................. B63h 21/12
[50] Field of Search ............................................. 115/0.5 A, 19, 49

[56] References Cited
UNITED STATES PATENTS

| 1,484,109 | 2/1924 | Beatty | 115/0.5 A |
| 3,166,039 | 1/1965 | Weymouth | 115/1 |

FOREIGN PATENTS

| 339,846 | 12/1930 | Great Britain | 115/19 |
| 1,445,795 | 6/1966 | France | 115/0.5 A |

Primary Examiner—Andrew H. Farrell
Attorney—Wolfe, Hubbard, Leydig, Voit & Osann ABSTRACT: An amphibious vehicle for the transport of cars or light vans over water, soft mud and the like, in which the car or van supplies the driving force for the two paddle wheels. The paddle wheels have open ended boxed around their circumferences so as to provide buoyancy and traction for the amphibious vehicle.

PATENTED OCT 12 1971

3,611,978

SHEET 1 OF 3

INVENTOR
ROBERT GRAY by: Wolfe, Hubbard, Voit & Osann
ATTYS.

PATENTED OCT 12 1971 3,611,978
SHEET 3 OF 3
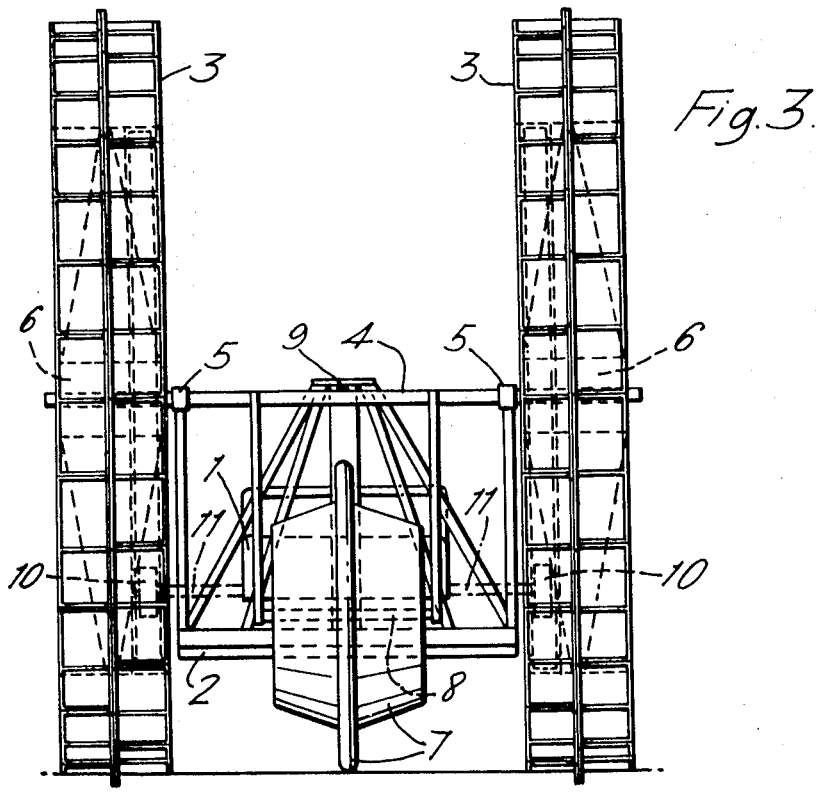
Fig. 3.
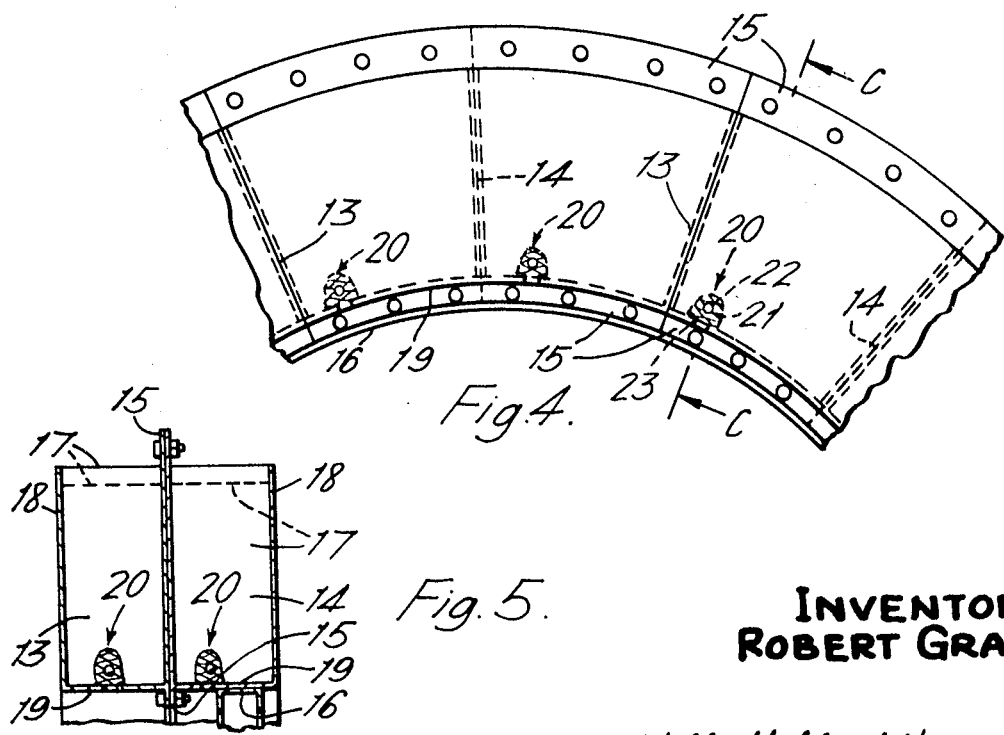
Fig. 4.
Fig. 5.
INVENTOR
ROBERT GRAY
by: Wolfe, Hubbard, Voit & Osann
ATTYS.

AMPHIBIOUS VEHICLES

The invention relates to amphibious vehicles and in particular to a vehicle for transporting a fully loaded motor car or light van over open land, mud or water. The vehicle, according to the invention, is equally suitable for transporting front or rear engined cars with front or rear wheeled drive. The vehicle obtains its propulsion by utilizing the power produced by the transported car or van. It is also possible to dismantle the vehicle and convert it to a trailer capable of being towed on a road.

According to the invention there is provided an amphibious vehicle for the transport of cars or light vans in which the car or van supplies the power for driving paddle wheels which are disposed on the amphibious vehicle.

Figure 1:
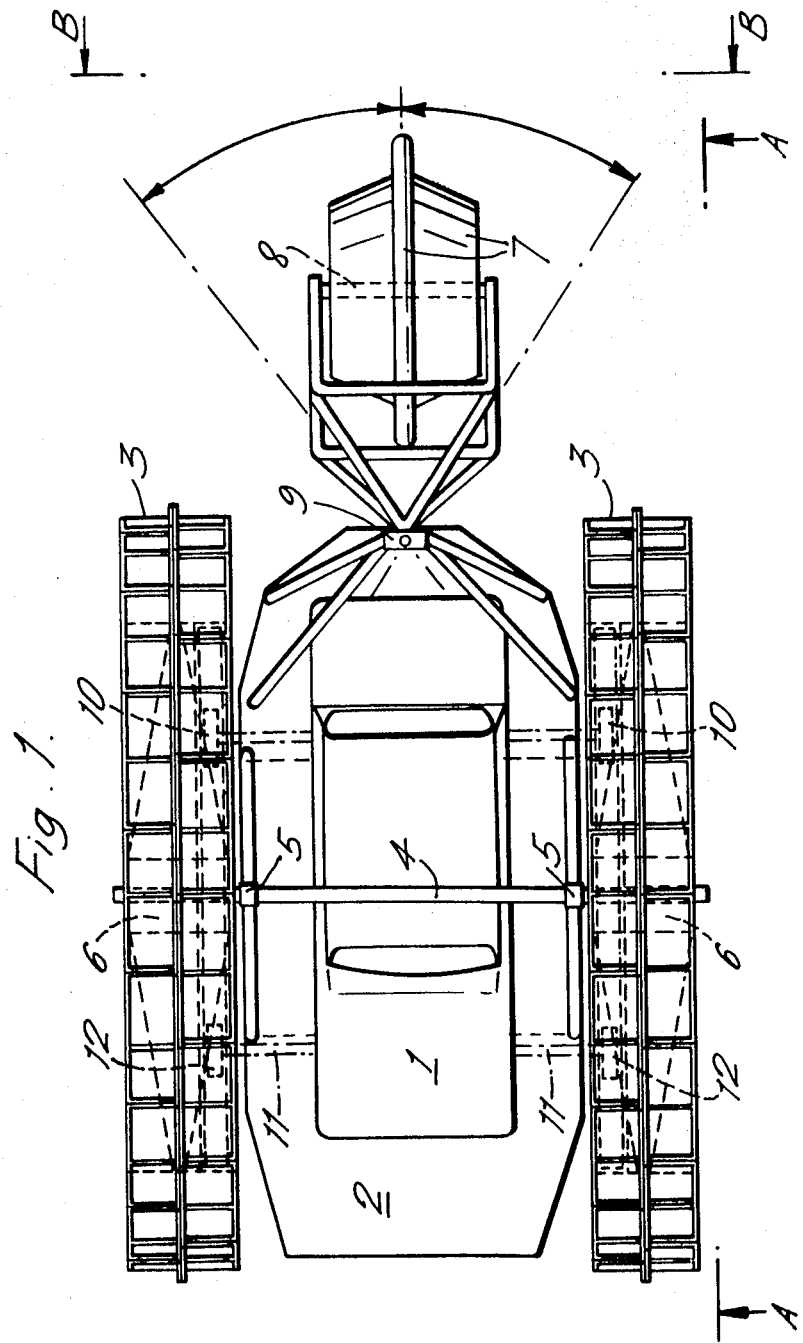
Figure 2:
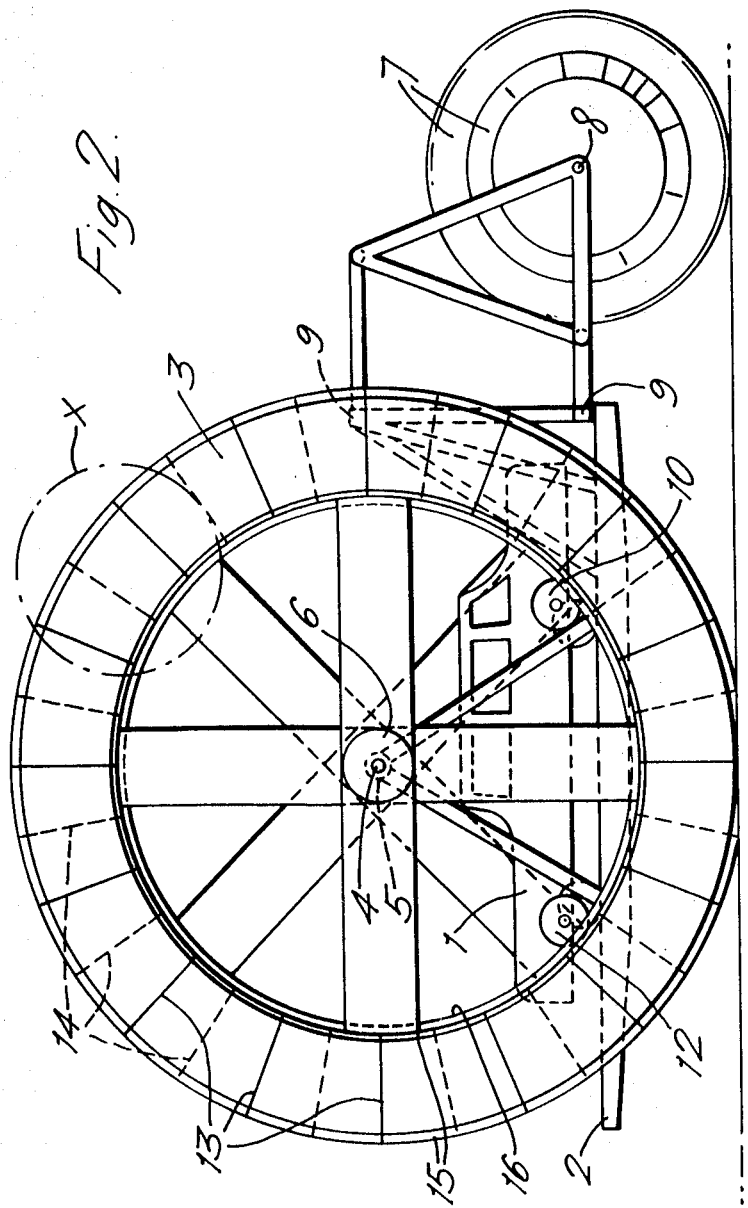

One embodiment of the invention is hereinbefore described and illustrated with reference to the accompanying drawings, in which:

FIG. 1 is a plan view of the vehicle;
FIG. 2 is a side view taken along A—A of FIG. 1;
FIG. 3 is an end elevation taken along B—B in FIG. 1;
FIG. 4 is an enlarged side view of the wheel as shown at X in FIG. 2; and
FIG. 5 is a cross section through the wheel taken through C—C in FIG. 4.

In the drawings, FIGS. 1, 2 and 3 show the outline of the invention. A platform 2 capable of supporting a motor car 1 is suspended 5 from a horizontally mounted axle 4 mounted centrally across and above the platform. On each end of the axle, which projects past the sides of the platform, is mounted a large diameter wheel 3. Both wheels are identical and the wheel hubs 6 are free to rotate on the common axle 4. The rims of these wheels 3 are of large cellular construction which are designed to carry the combined weight of the loaded car and transporting vehicle over hard or soft ground and also the wheels are capable of supporting the fully loaded vehicle on water by displacing water by part of the cellular rims.

Due to the platform hanging centrally from the common axle and the symmetrical section of the wheel rims, the center of gravity of the centrally loaded car will act vertically downwards through the axle and will cause an identical load to be transmitted to each wheel rim. While on water these loads acting on the symmetrical wheels will cause each wheel to be equally immersed.

To correct any tendency for the suspended platform to tilt for and aft due to the center of gravity of the loaded car not coinciding with the center of the platform, a third smaller wheel 7 is mounted on the stern of the platform. This wheel is constructed with a narrow rim, but the width of the wheel increases rapidly towards the hub. This wheel is free to rotate on an axle 8 whose axis is parallel to the main axle 4. The wheel mounting is pivoted on the stern of the platform about a vertical axis 9. This wheel acts as a jockey wheel steadying the platform. The narrow rim of the wheel gives some support to the platform while on land, and by rotating the wheel and its mounting about the pivot 9 it acts as a rudder on land or water. The thickening of the wheel section towards the hub gives progressive steadying buoyancy to the platform, and may be regarded as an outrigger or stabilizer.

To stiffen up the whole vehicle against sway caused by rough ground or wave motion, four guide wheels are mounted fore and aft on both sides of the platform 10, 12 with their axles parallel to the main axle. 4. These guide wheels bear and run in a continuous hollow sectioned track 16 mounted on the internal face of the rims of the two larger wheels.

Propulsion of the loaded vehicle is obtained by jacking up the pair of driving road wheels of the car or van 1 clear of the platform 2 and by coupling axially a flexible drive shaft II from these driving wheels directly to the nearest pair of guide wheels 10 for rear wheel drive cars and 12 for front wheel drive cars. Rotation of the car's driving road wheels will cause the flexible shafts to turn the respective pair of guide wheels 10 or 12 which are in contact with the guide section 16 fitted to the main wheels 3 and which will cause these large wheels to rotate in the same direction. The pair of guide wheels that are not being driven act as idlers to the main wheels 3. While the direction of the loaded vehicle is being changed by the rudder action of the jockey wheel 7 the relative speed of rotation of the two larger wheels 3 is absorbed by the differential gear of the transported car's transmission. The power output, speed of rotation and of directional rotation of these wheels are controlled directly by the engine and gear box of the transported car.

For cars of different longitudinal wheel base, the bearings of the driving pair of guide wheels mounted in the sides of the platform are capable of being moved fore and aft to line up with the axis of the cars driving wheels by moving the bearings in an arc about the main axle 4, while still maintaining contact between the guide wheels and the guide track 16 on the main wheels. The difference in track widths on different cars is taken up by a sliding splined shaft incorporated in each of the flexible drive shafts II.

The construction of the rims of the large wheels 3 is made up as follows. The rims are built up from a series of identical sectors 13 and 14 which are staggered and are bolted together back to back along the wheels center line to form an outside running rim and an inside wheel spoke anchorage continuously round the wheel 15. Each wheel sector 13 and 14 is made up in the form of an equally divided open topped box, each complete with three walls 17 and one common wall 18 running in a radial plane and the bottom 19 forming half of the internal face of the rim of the wheel. The external face of the rim is open showing the wall sections of all the sectors 13 and 14. While the rim is travelling on mud or water, buoyancy of the whole wheel is maintained by the air trapped in the series of upturned box sections as they revolve and are immersed in turn under the surface of the mud or water.

In order to prevent the suction effect of accidentally trapped water or mud from upsetting the balance or rotation of the large diameter wheels 3, each of the wheel sectors 13 and 14 is equipped with a one-way, nonreturn valve 20. While it will be apparent to those skilled in the art that any number of valves would be suitable for this purpose, a ball valve of the type commonly associated with snorkel type, underwater breathing tubes is shown in the illustrated embodiment. To this end, a close fitting wire cage 21 is attached to the internal face of the head of each of the respective wheel sectors 13 and 14, and an ordinary table-tennis ball 22 is centrally fitted therein for operatively closing a countersunk hole 23 communicating through the head of each respective sector.

Should any box sector become damaged, the damaged sector can be easily removed and replaced by an identical new sector without dismantling the whole rim of the wheel. By breaking selected bolted joints 15 in the rim section, the rim can be dismantled into manageable sectors.

For road transportation the main platform is designed to reduce the breadth to the legal maximum, whole the main axle is hinged at third points to decrease it's width also. The road wheels for this trailer would be a pair of guide wheels, while the broken down sections of the main wheels could be stacked on the trailer platform. The trailer can then be trailed by the car or van as required.

I claim

1. An amphibious vehicle for the transport of cars or light vans wherein the respective car or van being transported supplies the power for driving the amphibious vehicle, said vehicle comprising: a horizontally mounted axle, a pair of paddle wheels rotatably mounted on the respective ends of said axle, a platform suitable for supporting a car or van suspended from said axle so as to be horizontally aligned between said paddle wheels, and drive means coupled to at least one of said paddle wheels for transmitting the drive power of the respective car or van being transported to the amphibious vehicle.

2. An amphibious vehicle as set forth in claim 1, wherein said platform is centrally suspended from said axle so that the center of gravity of a centrally loaded car will act vertically downwards through the axle and thereby cause an identical load to be transmitted to each of the paddle wheels.

3. An amphibious vehicle as set forth in claim 1, wherein each of the paddle wheels includes a plurality of outwardly facing, open ended sectors adjacently positioned about the outer periphery of the wheel such that the open end of each respective sector lies on the outer circumference of the wheel.

4. An amphibious vehicle as set forth in claim 3, wherein each of said sectors includes a one-way valve internally positioned for communicating through the wall thereof.

5. An amphibious vehicle as set forth in claim 1, further including float means pivotally coupled to one end of said platform for adding stability to the vehicle and for assisting in steering the vehicle.

6. An amphibious vehicle as set forth in claim 1, wherein said drive means includes a flexible drive shaft for transmitting the drive power from the drive wheels of the car to said paddle wheels.